(12) United States Patent
Rademacher et al.

(10) Patent No.: US 8,067,503 B2
(45) Date of Patent: Nov. 29, 2011

(54) PROCESS FOR PRODUCING BLENDS OF SYNDIOTACTIC, 1,2-POLYBUTADIENE AND RUBBERY ELASTOMERS

(75) Inventors: Christine Rademacher, Akron, OH (US); Steven Luo, Copley, OH (US); Zhong-Ren Chen, Stow, OH (US); Walter Tomaszewski, Canton, OH (US); Edward Kelley, Tallmadge, OH (US)

(73) Assignee: Bridgestone Corporation, Tokyo (JP)

( * ) Notice: Subject to any disclaimer, the term of this patent is extended or adjusted under 35 U.S.C. 154(b) by 1123 days.

(21) Appl. No.: 11/625,976

(22) Filed: Jan. 23, 2007

(65) Prior Publication Data
US 2007/0161748 A1 Jul. 12, 2007

Related U.S. Application Data

(63) Continuation of application No. 10/494,601, filed as application No. PCT/US02/35402 on Nov. 5, 2002, now abandoned.

(60) Provisional application No. 60/338,840, filed on Nov. 5, 2001.

(51) Int. Cl.
*B60C 1/00* (2006.01)
(52) U.S. Cl. ........ 525/232; 525/191; 525/192; 152/525; 152/450
(58) Field of Classification Search .................. 525/191, 525/212; 502/117
See application file for complete search history.

(56) References Cited

U.S. PATENT DOCUMENTS

| | | | |
|---|---|---|---|
| 4,227,956 A | 10/1980 | Honda et al. | |
| 4,362,828 A | 12/1982 | Agarwal et al. | |
| 4,384,066 A | 5/1983 | O'Shea | |
| 4,622,193 A | 11/1986 | Kresge et al. | |
| 4,803,035 A | 2/1989 | Kresge et al. | |
| 4,822,545 A | 4/1989 | Kresge et al. | |
| 4,902,741 A | 2/1990 | Burroway et al. | |
| 4,967,818 A | 11/1990 | Gartland et al. | |
| 4,970,118 A | 11/1990 | Kresge et al. | |
| 5,021,381 A | 6/1991 | Burroway et al. | |
| 5,049,220 A | 9/1991 | Gartland et al. | |
| 5,058,647 A | 10/1991 | Gartland et al. | |
| 5,160,383 A | 11/1992 | Gartland et al. | |
| 5,626,697 A * | 5/1997 | Sandstrom et al. | 152/525 |
| 6,197,888 B1 | 3/2001 | Luo | |
| 6,291,591 B1 * | 9/2001 | Luo | 525/191 |
| 6,303,692 B1 * | 10/2001 | Luo | 525/191 |
| 2002/0170642 A1 | 11/2002 | Westermann et al. | |

FOREIGN PATENT DOCUMENTS

| | | |
|---|---|---|
| EP | 0 476 470 A1 | 3/1992 |
| WO | WO 02/066554 A1 | 8/2002 |

* cited by examiner

*Primary Examiner* — James J Seidleck
*Assistant Examiner* — Saira B Haider

(57) ABSTRACT

Blends of syndiotactic 1,2-polybutadiene and rubbery elastomers are prepared by a process that comprises polymerizing 1,3-butadiene monomer into syndiotactic 1,2-polybutadiene within a rubber cement of an elastomeric terpolymer by using a chromium-based, molybdenum-based, or iron-based catalyst composition. Polymer composition comprising the blend with improved properties is also provided.

18 Claims, No Drawings

PROCESS FOR PRODUCING BLENDS OF SYNDIOTACTIC, 1,2-POLYBUTADIENE AND RUBBERY ELASTOMERS

This application is a continuation of U.S. Ser. No. 10/494,601 filed Jun. 27, 2005, now abandoned, which is a continuation-in-part of international application PCT/US02/35402 filed Nov. 5, 2002, which claims priority from U.S. Provisional Patent Application No. 60/338,840 filed on Nov. 5, 2001, all of which are incorporated herein by reference.

BACKGROUND

The present invention is directed toward a process for producing blends of syndiotactic 1,2-polybutadiene and rubbery elastomers. The present invention is also directed to a polymer composition comprising a blend of syndiotactic 1,2-polybutadiene and a terpolymer polymerized from ethylene, at least one α-olefin monomer, and at least one diene monomer.

Tire sidewalls protect the ply and are therefore preferably resistant to weathering, ozone, abrasion, and tearing, while providing excellent flex fatigue resistance. Typical tire sidewall formulations include natural rubber (NR), styrene-butadiene (SBR), butadiene (BR), and halogenated butyl (HIIR). Ethylene-propylene-diene terpolymer (EPDM) is attractive because of its resistance to weathering and ozone.

EPDM, however, is not compatible with butadiene rubber and fillers, and has poor cut growth resistance. Blends of EPDM with crystalline polymers have shown improved cut growth properties at room temperature. At elevated temperatures, however, these materials have poor cut growth properties.

Syndiotactic 1,2-polybutadiene (sPB) is a crystalline thermoplastic resin that has a stereoregular structure in which the side-chain vinyl groups are located alternately on the opposite sides in relation to the polymeric main chain. sPB uniquely exhibits the properties of both plastics and rubber, and therefore it has many uses. It can also be blended into and co cured with natural and synthetic rubbers.

Syndiotactic 1,2-polybutadiene can be made by solution, emulsion, or suspension polymerization. Generally, syndiotactic 1,2-polybutadiene has a melting temperature within the range of about 195° C. to about 215° C., but due to processability considerations, it is generally desirable for syndiotactic 1,2 polybutadiene to have a melting temperature of less than about 195° C.

Because syndiotactic 1,2-polybutadiene is insoluble in common solvents at normal polymerization temperatures, a common technical difficulty in the synthesis of syndiotactic 1,2-polybutadiene is that the polymerization mixture is an extremely thick slurry at the commercially desirable polymer concentration of 10% to 25% by weight. This thick slurry becomes difficult to stir and transfer, thereby diminishing heat transfer efficiency and interfering with proper process control. Also, the slurry contributes to reactor fouling due to the undesirable build-up of insoluble polymer on the baffles, agitator blades, agitator shafts, and walls of the polymerization reactor. It is therefore necessary to clean the reactor on a regular basis, which results in frequent shutdowns of continuous processes and serious limitations of the run length of batch processes. The task of cleaning the fouled reactor is generally difficult and time-consuming. All of these drawbacks detrimentally affect productivity and the cost of operation.

The physical properties of rubbery elastomers can be improved by blending crystalline polymers therein. For example, incorporating syndiotactic 1,2-polybutadiene into rubber compositions that are utilized in the supporting carcass of tires greatly improves the green strength of those compositions. Also, incorporating syndiotactic 1,2-polybutadiene into tire tread compositions can reduce heat build-up and improve wear characteristics of tires. The green strength of synthetic rubbers such as cis-1,4-polybutadiene can also be improved by incorporating a small amount of syndiotactic 1,2-polybutadiene.

Blends of crystalline polymers and rubbery elastomers are typically prepared by standard mixing techniques. For example, these blends can be prepared by mixing or kneading and heat-treating a crystalline polymer and a rubbery elastomer by utilizing generally known mixing equipment such as a Banbury mixer, a Brabender mixer, an extruder, a kneader, or a mill mixer. These high-temperature mixing procedures, however, have certain drawbacks including high processing costs, polymer degradation and crosslinking, inadequate mixing, as well as various process limitations. Due to the high vinyl content of syndiotactic 1,2-polybutadiene, polymer degradation and crosslinking is a particularly severe problem for mixing syndiotactic 1,2-polybutadiene with elastomers at high temperatures.

Attempts to polymerize 1,3-butadiene into syndiotactic 1,2-polybutadiene within a rubber cement have been hampered by catalyst inefficiencies and toxicities. For example, U.S. Pat. No. 4,379,889 teaches polymerizing 1,3-butadiene into syndiotactic 1,2-polybutadiene within a rubber cement by using a catalyst system comprising a cobalt compound, a dialkylaluminum halide, carbon disulfide, and an electron donative compound. And, U.S. Pat. No. 5,283,294 teaches a similar process that employs a catalyst system comprising a cobalt compound, an organoaluminum compound, and carbon disulfide. These methods, however, are inferior because the catalyst systems that are employed suffer from low catalytic activity, poor stereoselectivity, the need for toxic, halogenated solvents, and the many drawbacks associated with carbon disulfide including low flash point, obnoxious smell, high volatility and toxicity.

Therefore, it would be advantageous to develop a new and significantly improved process for producing blends of syndiotactic 1,2-polybutadiene and rubbery elastomers.

SUMMARY OF THE INVENTION

In general, the present invention provides a process for preparing blends of syndiotactic 1,2-polybutadiene and rubbery elastomers comprising the steps of (1) providing a mixture of a rubber cement and 1,3-butadiene monomer; and (2) polymerizing the 1,3-butadiene into syndiotactic 1,2-polybutadiene within the rubber cement by using a catalyst composition that is formed by combining, (a) a chromium-containing compound, (b) a hydrogen phosphite, and (c) an organomagnesium compound or (a) a molybdenum-containing compound or an iron-containing compound, (b) a hydrogen phosphite, and (c) an organoaluminum compound.

The present invention further provides a process for preparing blends of syndiotactic 1,2-polybutadiene and rubbery elastomers comprising the steps of (1) providing a mixture of a rubber cement and 1,3-butadiene monomer, where the rubber cement comprises an elastomeric terpolymer polymerized from ethylene, at least one-olefin monomer, and at least one diene monomer; and (2) preparing a catalyst composition, where the catalyst composition is prepared by combining, outside the presence of the mixture of rubber cement and monomer, (a) a chromium-containing compound, (b) a hydrogen phosphite, and (c) an organomagnesium compound or (a) a molybdenum-containing compound or an iron-containing compound, (b) a hydrogen phosphite, and (c) an organoaluminum compound; and (3) adding the catalyst composition to the mixture and thereby polymerizing the 1,3-butadiene monomer into syndiotactic 1,2-polybutadiene within the rubber cement.

Advantageously, the process of this invention directly provides blends of syndiotactic 1,2-polybutadiene and rubbery elastomers by synthesizing syndiotactic 1,2-polybutadiene within a rubber cement and thereby obviates the need for high-temperature mixing. Also, good dispersion of syndiotactic 1,2-polybutadiene throughout rubbery elastomers can be easily and economically achieved. Significantly, the process of this invention eliminates the problems of high processing costs, polymer degradation and crosslinking, inadequate mixing, and various process limitations that are associated with high-temperature mixing procedures. The process of this invention also alleviates the problems of polymer cement thickness and reactor fouling that are associated with the synthesis of syndiotactic 1,2-polybutadiene in the absence of a rubbery elastomer.

In addition, the catalyst systems employed in this invention have very high catalytic activity and stereoselectivity for the syndiospecific polymerization of 1,3-butadiene. This activity and selectivity, among other advantages, allows syndiotactic 1,2-polybutadiene to be produced in very high yields within a rubber cement. Additionally, these catalyst compositions do not contain carbon disulfide, and therefore the toxicity, objectionable smell, dangers, and expense associated with the use of carbon disulfide are eliminated. Further, the chromium, molybdenum, and iron compounds are generally stable, inexpensive, relatively innocuous, and readily available. Furthermore, these catalyst compositions have high catalytic activity in a wide variety of solvents including the environmentally preferred nonhalogenated solvents such as aliphatic and cycloaliphatic hydrocarbons.

Furthermore, blends of syndiotactic 1,2-polybutadiene and elastomeric terpolymers polymerized from ethylene, at least one α-olefin monomer, and at least one diene monomer, prepared by the process of the present invention, exhibit improved cut growth resistance at elevated temperatures.

DETAILED DESCRIPTION OF ILLUSTRATIVE EMBODIMENTS

The present invention is generally directed toward a process for producing blends of syndiotactic 1,2-polybutadiene and rubbery elastomers. Blends of syndiotactic 1,2-polybutadiene and rubbery elastomers can be directly produced by polymerizing 1,3-butadiene monomer into syndiotactic 1,2 polybutadiene within a rubber cement by using chromium-based, molybdenum-based, or iron-based catalyst compositions.

The process includes the steps of: (1) providing a mixture of a rubber cement and 1,3-butadiene monomer, where the rubber cement includes at least one rubbery elastomer within an organic solvent, and (2) polymerizing the 1,3 butadiene monomer into syndiotactic 1,2-polybutadiene within the rubber cement by using a chromium-based, molybdenum-based, or iron-based catalyst composition. The chromium-based catalyst composition is formed by combining (a) a chromium-containing compound, (b) a hydrogen phosphite, and (c) an organomagnesium compound. The molybdenum-based catalyst composition is formed by combining (a) a molybdenum-containing compound, (b) a hydrogen phosphite, and (c) an organoaluminum compound. The iron-based catalyst composition is formed by combining (a) an iron-containing compound, (b) a hydrogen phosphite, and (c) an organoaluminum compound.

The rubber cement employed in this invention is a solution, preferably viscous, of at least one rubbery elastomer in an organic solvent. Virtually any type of rubbery elastomer can be used to prepare the rubber cement. In a preferred embodiment, the rubbery elastomer includes an elastomeric terpolymer polymerized from ethylene, at least one α-olefin monomer, and at least one diene monomer. The α-olefins may include, but are not limited to, propylene, 1-butene, 1-hexene, 4-methyl-1-pentene, 1-octene, 1-decene, or combinations thereof. The diene monomers may include, but are not limited to, 5-ethylidene-2-norbornene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, 5-vinyl-2-norbornene and the like, or a combination thereof. When the terpolymer is polymerized from ethylene, propylene, and at least one diene monomer, the polymer may be referred to as EPDM.

Elastomeric terpolymers prepared from ethylene, at least one α-olefin monomer, and at least one diene monomer may be prepared by methods known in the art, and they are commercially available under the tradenames Vistalon™ (Exxon Mobil Chemical Co.; Houston, Tex.), Keltan™ (DSM Copolymers; Baton Rouge, La.), Nordel™ IP (DuPont Dow Elastomers; Wilmington, Del.), ElastoFlo™ (Union Carbide; Danbury, Conn.), and Buna™ (Bayer Corp.; Germany).

The elastomeric terpolymers described above may be used in combination with each other, or other rubbery elastomers. Examples of other rubbery elastomers include, but are not limited to, natural rubber, low-vinyl polybutadiene, cis-1,4-polybutadiene, amorphous 1,2-polybutadiene, low-vinyl polyisoprene, cis-1,4-polyisoprene, polyisobutylene, neoprene, ethylene-propylene copolymer rubber (EPR), styrene-butadiene rubber (SBR), styrene-isoprene rubber (SIR), styrene-isoprene-butadiene rubber (SIBR), styrene-butadiene-styrene block copolymer (SBS), styrene-butadiene block copolymer (SB), hydrogenated styrene butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene-styrene block copolymer (SEPS), hydrogenated styrene-isoprene block copolymer (SEP), polysulfide rubber, acrylic rubber, urethane rubber, silicone rubber, epichlorohydrin rubber, and the like. Mixtures of the above rubbery elastomers may also be used. These rubbery elastomers are well known and, for the most part, are commercially available. Also, those skilled in the art will be able to readily synthesize these rubbery elastomers by using techniques that are well known in the art.

The rubber cement can be prepared by dissolving the rubbery elastomers in an organic solvent. When commercially available rubbery elastomers are employed to prepare the rubber cement, it may be necessary to purify the commercial products before use in order to remove residual water and additives that may become catalyst poisons in the subsequent step of polymerizing 1,3-butadiene monomer into syndiotactic 1,2-polybutadiene within the rubber cement.

In one embodiment, the rubber cement is prepared in situ by polymerizing one or more appropriate monomers into rubbery elastomers in an organic solvent within the same reactor that is subsequently used for polymerizing 1,3-butadiene into syndiotactic 1,2-polybutadiene. Many methods of synthesizing rubbery elastomers are known in the art. Preferably, however, the catalyst utilized in preparing the rubbery elastomers should not contain any ingredients that may interfere with the catalyst subsequently used in the step of polymerizing 1,3-butadiene monomer into syndiotactic 1,2-polybutadiene within the rubber cement.

In preparing the rubber cement, it is desirable to select an organic solvent that is inert with respect to the catalyst systems that will be employed to synthesize the rubbery elastomers and the syndiotactic 1,2-polybutadiene. Suitable types of organic solvents that can be utilized in preparing the rubber cement include, but are not limited to, aliphatic, cycloaliphatic, and aromatic hydrocarbons. Some representative examples of suitable aliphatic solvents include n-pentane, n-hexane, n-heptane, n-octane, n-nonane, n-decane, isopentane, isohexanes, isoheptanes, isooctanes, 2,2-dimethylbutane, petroleum ether, kerosene, petroleum spirits, and the like. Some representative examples of suitable cycloaliphatic solvents include cyclopentane, cyclohexane, methylcyclopentane, methylcyclohexane, and the like. Some representative examples of suitable aromatic solvents include benzene, toluene, xylenes, ethylbenzene, diethylbenzene, mesitylene, and the like. Commercial mixtures of the above hydrocarbons may also be used. For environmental reasons, aliphatic and cycloaliphatic solvents are highly preferred.

The concentration of the rubbery elastomers in the rubber cement varies depending on the types of the rubbery elastomers and organic solvent employed. The concentration of the rubbery elastomers within the cement is preferably from about 5% to about 35% by weight of the rubber cement, more preferably from about 10% to 30% by weight of the rubber cement, and even more preferably from about 15% to about 25% by weight of the rubber cement.

The rubber cement is then utilized as a polymerization medium for the stereospecific polymerization of 1,3-butadiene monomer into syndiotactic 1,2-polybutadiene. Thus, 1,3-butadiene monomer, catalyst composition, and optionally additional organic solvent are added to the rubber cement. The order in which the 1,3-butadiene monomer, the catalyst composition, and the solvent are added to the rubber cement does not limit the scope of the invention, although it may be preferable to add the catalyst composition, or at least an ingredient thereof, prior to adding the 1,3-butadiene monomer.

The amount of 1,3-butadiene monomer added to the rubber cement is contingent upon the proportion of syndiotactic 1,2-polybutadiene desired in the resultant polymer blend. The additional organic solvent can be selected from the group of the organic solvents mentioned above for the preparation of the rubber cement, and may be the same as or different from the organic solvent used in preparing the rubber cement. The addition of 1,3-butadiene monomer to the rubber cement may not be required in the case where 1,3-butadiene monomer is employed to prepare the rubbery elastomers and the polymerization is stopped before all the 1,3-butadiene is consumed, thereby providing the remaining 1,3-butadiene monomer for synthesizing the syndiotactic 1,2-polybutadiene without the need to add additional 1,3-butadiene monomer.

Although the preferred embodiment of the present invention is directed toward the polymerization of 1,3-butadiene into syndiotactic 1,2-polybutadiene within a rubber cement, other conjugated diene monomers can be polymerized to form conjugated diene polymers, preferably crystalline polymers, within a rubber cement.

Chromium-based catalyst compositions useful for the polymerization of 1,3-butadiene into syndiotactic 1,2-polybutadiene are described in U.S. Pat. Nos. 6,201,080 and 6,117,956, which are incorporated herein by reference. The preferred chromium-based catalyst composition is formed by combining (a) a chromium-containing compound, (b) a hydrogen phosphite, and (c) an organomagnesium compound. In addition to the three catalyst ingredients (a), (b), and (c), other organometallic compounds or Lewis bases that are known in the art can also be added, if desired.

Various chromium-containing compounds or mixtures thereof can be employed as ingredient (a) of the chromium-based catalyst composition utilized in this invention. It is generally advantageous to employ chromium-containing compounds that are soluble in a hydrocarbon solvent such as aromatic hydrocarbons, aliphatic hydrocarbons, or cycloaliphatic hydrocarbons. Hydrocarbon-insoluble chromium-containing compounds, however, can be suspended in the polymerization medium to form the catalytically active species and are therefore also useful.

The chromium atom in the chromium-containing compounds can be in various oxidation states ranging from 0 up to +6. Divalent chromium compounds (also called chromous compounds), wherein the chromium is in the +2 oxidation state, and trivalent chromium compounds (also called chromic compounds), wherein the chromium is in the +3 oxidation state are preferred. Suitable types of chromium-containing compounds that can be utilized include, but are not limited to, chromium carboxylates, chromium organophosphates, chromium organophosphonates, chromium organophosphinates, chromium carbamates, chromium dithiocarbamates, chromium xanthates, chromium β-diketonates, chromium alkoxides or aryloxides, chromium halides, chromium pseudo-halides, chromium oxyhalides, and organochromium compounds.

Suitable chromium carboxylates include chromium formate, chromium acetate, chromium acrylate, chromium methacrylate, chromium valerate, chromium gluconate, chromium citrate, chromium fumarate, chromium lactate, chromium maleate, chromium oxalate, chromium 2-ethylhexanoate, chromium neodecanoate, chromium naphthenate, chromium stearate, chromium oleate, chromium benzoate, and chromium picolinate.

Suitable chromium organophosphates include chromium dibutyl phosphate, chromium dipentyl phosphate, chromium dihexyl phosphate, chromium diheptyl phosphate, chromium dioctyl phosphate, chromium bis(1-methylheptyl) phosphate, chromium bis(2-ethylhexyl) phosphate, chromium didecyl phosphate, chromium didodecyl phosphate, chromium dioctadecyl phosphate, chromium dioleyl phosphate, chromium diphenyl phosphate, chromium bis(p-nonylphenyl) phosphate, chromium butyl(2-ethylhexyl)phosphate, chromium (1-methylheptyl)(2-ethylhexyl) phosphate, and chromium (2-ethylhexyl)(p-nonylphenyl) phosphate.

Suitable chromium organophosphonates include chromium butyl phosphonate, chromium pentyl phosphonate, chromium hexyl phosphonate, chromium heptyl phosphonate, chromium octyl phosphonate, chromium (1 methylheptyl) phosphonate, chromium (2-ethylhexyl) phosphonate, chromium decyl phosphonate, chromium dodecyl phosphonate, chromium octadecyl phosphonate, chromium oleyl phosphonate, chromium phenyl phosphonate, chromium (p-nonylphenyl)phosphonate, chromium butyl butylphosphonate, 10 chromium pentyl pentylphosphonate, chromium hexyl hexylphosphonate, chromium heptyl heptylphosphonate, chromium octyl octylphosphonate, chromium (1-methylheptyl) (1-methylheptyl)phosphonate, chromium (2-ethyl hexyl) (2-ethylhexyl)phosphonate, chromium decyl decylphosphonate, chromium dodecyl dodecylphosphonate, chromium octadecyl octadecylphosphonate, chromium oleyl oleylphosphonate, chromium phenyl phenylphosphonate, chromium (p-nonylphenyl) (p-nonylphenyl)phosphonate, chromium butyl (2-ethylhexyl)phosphonate, chromium (2-ethylhexyl)butylphosphonate, chromium (1-methylheptyl) (2-ethylhexyl)phosphonate, chromium (2-ethylhexyl) (1-methylheptyl)phosphonate, chromium (2-ethylhexyl)(p-nonylphenyl)phosphonate, and chromium (p-nonylphenyl) (2-ethylhexyl)phosphonate.

Suitable chromium organophosphinates include chromium butylphosphinate, chromium pentylphosphinate, chromium hexylphosphinate, chromium heptylphosphinate, chromium octylphosphinate, chromium (1-methylheptyl) phosphinate, chromium (2-ethylhexyl)phosphinate, chromium decylphosphinate, chromium dodecylphosphinate, chromium octadecylphosphinate, chromium oleylphosphinate, chromium phenylphosphinate, chromium (p-nonylphenyl)phosphinate, chromium dibutylphosphinate, chromium dipentylphosphinate, chromium dihexylphosphinate, chromium diheptylphosphinate, chromium dioctylphosphinate, chromium bis(1-methylheptyl)phosphinate, chromium bis (2-ethylhexyl)phosphinate, chromium didecylphosphinate, chromium didodecylphosphinate, chromium dioctadecylphosphinate, chromium dioleylphosphinate, chromium diphenylphosphinate, chromium bis(p-nonylphenyl)phosphinate, chromium butyl(2-ethylhexyl)phosphinate, chromium (1-methylheptyl)(2-ethylhexyl)phosphinate, and chromium (2-ethylhexyl)(p-nonylphenyl)phosphinate.

Suitable chromium carbamates include chromium dimethylcarbamate, chromium diethylcarbamate, chromium diisopropylcarbamate, chromium dibutylcarbamate, and chromium dibenzylcarbamate.

Suitable chromium dithiocarbamates include chromium dimethyldithiocarbamate, chromium diethyldithiocarbamate, chromium diisopropyldithiocarbamate, chromium dibutyldithiocarbamate, and chromium dibenzyldithiocarbamate.

Suitable chromium xanthates include chromium methylxanthate, chromium ethylxanthate, chromium isopropylxanthate, chromium butylxanthate, and chromium benzylxanthate.

Suitable chromium diketonates include chromium acetylacetonate, chromium trifluoroacetylacetonate, chromium hexafluoroacetylacetonate, chromium benzoylacetonate, chromium 2,2,6,6-tetramethyl-3,5-heptanedionate, chromium dioxide bis(acetylacetonate), chromium dioxide bis (trifluoroacetylacetonate), chromium dioxide bis(hexafluoroacetylacetonate), chromium dioxide bis (benzoylacetonate), and chromium dioxide bis(2,2,6,6-tetramethyl-3,5-heptanedionate).

Suitable chromium alkoxides or aryloxides include chromium methoxide, chromium ethoxide, chromium isopropoxide, chromium 2-ethylhexoxide, chromium phenoxide, chromium nonylphenoxide, and chromium naphthoxide.

Suitable chromium halides include chromium hexafluoride, chromium pentafluoride, chromium tetrafluoride, chromium trifluoride, chromium pentachloride, chromium tetrachloride, chromium bichloride, chromium tetrabromide, chromium tribromide, chromium triiodide, and chromium diiodide.

Suitable chromium pseudo-halides include chromium cyanide, chromium cyanate, chromium thiocyanate, and chromium azide.

Suitable chromium oxyhalides include chromium oxytetrafluoride, chromium dioxydifluoride, chromium oxytetrachloride, chromium oxytrichloride, chromium dioxydichloride, chromium oxytribromide, and chromium dioxydibromide.

The term "organochromium compound" refers to any chromium compound containing at least one chromium-carbon bond. Suitable organochromium compounds include tris(allyl)chromium, tris(methallyl)chromium, tris(crotyl)chromium, bis(cyclopentadienyl)chromium (also called chromocene), bis(pentamethylcyclopentadienyl)chromium, bis (ethylbenzene)chromium (also called decamethylchromocene), bis(benzene)chromium, bis(ethylbenzene)chromium, bis(mesitylene)chromium, bis(pentadienyl)chromium, bis(2,4-dimethylpentadienyl)chromium, bis (allyl)tricarbonylchromium, (cyclopentadienyl) (pentadienyl)chromium, terra(1-norbornyl)chromium, (trimethylenemethane)tetracarbonylchromium, bis(butadiene)dicarbonylchromium, (butadiene)tetracarbonylchromium, and bis(cyclooctatetraene)chromium.

Useful hydrogen phosphite compounds that can be employed as ingredient (b) of the chromium-based catalyst composition utilized in this invention are either acyclic hydrogen phosphites, cyclic hydrogen phosphites, or mixtures thereof.

In general, acyclic hydrogen phosphites may be represented by the following keto-enol tautomeric structures:

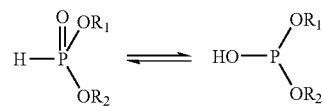

where $R_1$ and $R_2$, which may be the same or different, are mono-valent organic groups. Preferably, $R_1$ and $R_2$ are hydrocarbyl groups such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms. The acyclic hydrogen phosphites exist mainly as the keto tautomer (shown on the left), with the enol tautomer (shown on the right) being the minor species. The equilibrium constant for the above-mentioned tautomeric equilibrium is dependent upon factors such as the temperature, the types of $R_1$ and $R_2$ groups, the type of solvent, and the like. Both tautomers may be associated in dimeric, trimeric or oligomeric forms by hydrogen bonding. Either of the two tautomers or mixtures thereof can be employed as the ingredient (b) of the chromium-based catalyst composition utilized in this invention.

Suitable acyclic hydrogen phosphites include dimethyl hydrogen phosphite, diethyl hydrogen phosphite, dibutyl hydrogen phosphite, dihexyl hydrogen phosphite, dioctyl hydrogen phosphite, didecyl hydrogen phosphite, didodecyl hydrogen phosphite, dioctadecyl hydrogen phosphite, bis(2, 2,2 trifluoroethyl) hydrogen phosphite, diisopropyl hydrogen phosphite, bis(3,3 dimethyl-2-butyl) hydrogen phosphite, bis (2,4-dimethyl-3-pentyl) hydrogen phosphite, di-t-butyl hydrogen phosphite, bis(2-ethylhexyl) hydrogen phosphite, dineopentyl hydrogen phosphite, bis(cyclopropylmethyl) hydrogen phosphite, bis(cyclobutylmethyl) hydrogen phosphite, bis(cyclopentylmethyl) hydrogen phosphite, bis(cyclohexylmethyl) hydrogen phosphite, dicyclobutyl hydrogen phosphite, dicyclopentyl hydrogen phosphite, dicyclohexyl hydrogen phosphite, dimethyl hydrogen phosphite, diphenyl hydrogen phosphite, dinaphthyl hydrogen phosphite, dibenzyl hydrogen phosphite, bis(1-naphthylmethyl) hydrogen phosphite, diallyl hydrogen phosphite, dimethallyl hydrogen phosphite, dicrotyl hydrogen phosphite, ethyl butyl hydrogen phosphite, methyl hexyl hydrogen phosphite, methyl neopentyl hydrogen phosphite, methyl phenyl hydrogen phosphite, methyl cyclohexyl hydrogen phosphite, methyl benzyl hydrogen phosphite, and the like. Mixtures of the above dihydrocarbyl hydrogen phosphites may also be utilized.

In general, cyclic hydrogen phosphites contain a divalent organic group that bridges between the two oxygen atoms that are singly-bonded to the phosphorus atoms. These cyclic hydrogen phosphites may be represented by the following keto-enol tautomeric structures:

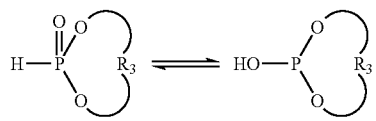

where $R_3$ is a divalent organic group. Preferably, $R_3$ is a hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to 20 carbon atoms. These hydrocarbylene groups may contain heteroatoms such as, but not limited to, nitrogen, oxygen, silicon, sulfur, and phosphorus atoms. The cyclic hydrogen phosphites exist mainly as the keto tautomer (shown on the left), with the enol tautomer (shown on the right) being the minor species. The equilibrium constant for the above-mentioned tautomeric equilibrium is dependent upon factors such as the temperature, the types of $R_3$ group, the type of solvent, and the like. Both tautomers may be associated in dimeric, trimeric or oligomeric forms by hydrogen bonding. Either of the two tautomers or mixtures thereof can be employed as the ingredient (b) of the chromium-based catalyst composition utilized in this invention.

The cyclic hydrogen phosphites may be synthesized by the transesterification reaction of an acyclic dihydrocarbyl hydrogen phosphite (usually dimethyl hydrogen phosphite or diethyl hydrogen phosphite) with an alkylene diol or an arylene diol. Procedures for this transesterification reaction are well known to those skilled in the art. Typically, the transesterification reaction is carried out by heating a mixture of an acyclic dihydrocarbyl hydrogen phosphite and an alkylene diol or an arylene diol. Subsequent distillation of the side-product alcohol (usually methanol or ethanol) that results from the transesterification reaction leaves the new-made cyclic hydrogen phosphite.

Suitable cyclic alkylene hydrogen phosphites include 2-oxo-(2H)-5-butyl-5-ethyl-1,3,2-dioxaphosphorinane, 2-oxo-(2H)-5,5-dimethyl-1,3,2-dioxaphosphorinane, 2-oxo-(2H)-1,3,2-dioxaphosphorinane, 2-oxo-(2H)-4-methyl 1,3,2-dioxaphosphorinane, 2-oxo-(2H)-5-ethyl-5-methyl-1,3,2-dioxaphosphorinane, 2-oxo-(2H)-5,5-diethyl-1,3,2-dioxaphosphorinane, 2-oxo-(2H)-5-methyl-5-propyl-1,3,2-dioxaphosphorinane, 2-oxo-(2H)-4-isopropyl-5,5-dimethyl-1,3,2-dioxaphosphorinane, 2-oxo-(2H)-4,6-dimethyl-1,3,2-dioxaphosphorinane, 2-oxo-(2H)-4-propyl-5-ethyl-1,3,2-dioxaphosphorinane, 2-oxo-(2H)-4-methyl-1,3,2-dioxaphospholane, 2-oxo-(2H)-4,5-dimethyl-1,3,2-dioxaphospholane, 2-oxo-(2H)-4,4,5,5-tetramethyl-1,3,2-dioxaphospholane, and the like. Mixtures of the above cyclic alkylene hydrogen phosphites may also be utilized.

Suitable cyclic arylene hydrogen phosphites include 2-oxo-(2H)-4,5-benzo-1,3,2-dioxaphospholane, 2-oxo-(2H)-4,5-(3'-methylbenzo)-1,3,2-dioxaphospholane, 2-oxo-(2H)-4,5-(4'-methylbenzo)-1,3,2-dioxaphospholane, 2-oxo-(2H)-4,5-(4'-tert-butylbenzo)-1,3,2-dioxaphospholane, 2-oxo-(2H)-4,5-naphthalo-1,3,2-dioxaphospholane, and the like. Mixtures of the above cyclic arylene hydrogen phosphites may also be utilized.

The chromium-based catalyst composition utilized in this invention further comprises an organomagnesium compound, which has been designated as ingredient (c). As used herein, the term "organomagnesium compound" refers to any magnesium compound containing at least one magnesium-carbon bond. Organomagnesium compounds that are soluble in a hydrocarbon solvent are preferably employed.

A preferred class of organomagnesium compounds that can be utilized as ingredient (c) of the chromium-based catalyst composition utilized in this invention is represented by the general formula $Mg(R_4)_2$, where each $R_4$, which may be the same or different, is a mono-valent organic group, with the proviso that the group is attached to the magnesium atom via a carbon atom. Preferably, each $R_4$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atom.

Suitable dihydrocarbylmagnesium compounds include diethylmagnesium, di-n-propylmagnesium, diisopropylmagnesium, dibutylmagnesium, dihexylmagnesium, diphenylmagnesium, dibenzylmagnesium, and mixtures thereof. Dibutylmagnesium is particularly useful due to its availability and its solubility in aliphatic and cycloaliphatic hydrocarbon solvents.

Another class of organomagnesium compounds that can be utilized as ingredient (c) of the catalyst composition utilized in this invention is represented by the general formula $R_5MgX$, where $R_5$ is a mono-valent organic group, with the proviso that the group is attached to the magnesium atom via a carbon atom, and X is a hydrogen atom, a halogen atom, a carboxylate group, an alkoxide group, or an aryloxide group. Preferably, $R_5$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Preferably, X is a carboxylate group, an alkoxide group, or an aryloxide group, with each group preferably containing 1 to 20 carbon atoms.

Suitable types of organomagnesium compounds that are represented by the general formula $R_5MgX$ include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Suitable organomagnesium compounds that are represented by the general formula $R_5MgX$ include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Molybdenum-based catalyst compositions are described in U.S. Ser. No. 09/700,017, which is incorporated herein by reference. The molybdenum-based catalyst composition is formed by combining (a) a molybdenum-containing compound, (b) a hydrogen phosphite, and (c) an organoaluminum compound. In addition to the three catalyst ingredients (a), (b), and (c), other organometallic compounds or Lewis bases can also be added, if desired.

Various molybdenum-containing compounds or mixtures thereof can be employed as ingredient (a) of the catalyst composition utilized in this invention. It is generally advantageous to employ molybdenum-containing compounds that are soluble in hydrocarbon solvents such as aromatic hydrocarbons, aliphatic hydrocarbons, or cycloaliphatic hydrocarbons. Hydrocarbon insoluble molybdenum-containing compounds, however, can be suspended in the polymerization medium to form the catalytically active species and are therefore also useful.

The molybdenum atom in the molybdenum-containing compounds can be in various oxidation states ranging from 0 up to +6. Suitable types of molybdenum-containing compounds that can be utilized include, but are not limited to, molybdenum carboxylates, molybdenum organophosphates, molybdenum organophosphonates, molybdenum organophosphinates, molybdenum carbamates, molybdenum dithiocarbamates, molybdenum xanthates, molybdenum β-diketonates, molybdenum alkoxides or aryloxides, molybdenum halides, molybdenum pseudo-halides, molybdenum oxyhalides, and organomolybdenum compounds.

Suitable molybdenum carboxylates include molybdenum formate, molybdenum acetate, molybdenum acrylate, molybdenum methacrylate, molybdenum valerate, molybdenum gluconate, molybdenum citrate, molybdenum fumarate, molybdenum lactate, molybdenum maleate, molybdenum oxalate, molybdenum 2-ethylhexanoate, molybdenum neodecanoate, molybdenum naphthenate, molybdenum stearate, molybdenum oleate, molybdenum benzoate, and molybdenum picolinate.

Suitable molybdenum organophosphates include molybdenum dibutyl phosphate, molybdenum dipentyl phosphate, molybdenum dihexyl phosphate, molybdenum diheptyl phosphate, molybdenum dioctyl phosphate, molybdenum bis (1-methylheptyl) phosphate, molybdenum bis(2-ethylhexyl) phosphate, molybdenum didecyl phosphate, molybdenum didodecyl phosphate, molybdenum dioctadecyl phosphate, molybdenum dioleyl phosphate, molybdenum diphenyl phosphate, molybdenum bis(p-nonylphenyl) phosphate, molybdenum butyl (2-ethylhexyl) phosphate, molybdenum (1-methylheptyl) (2-ethylhexyl)phosphate, and molybdenum (2-ethylhexyl) (p-nonylphenyl) phosphate.

Suitable molybdenum organophosphonates include molybdenum butyl phosphonate, molybdenum pentyl phosphonate, molybdenum hexyl phosphonate, molybdenum heptyl phosphonate, molybdenum octyl phosphonate, molybdenum (1-methylheptyl) phosphonate, molybdenum (2-ethylhexyl) phosphonate, molybdenum decyl phosphonate, molybdenum dodecyl phosphonate, molybdenum octadecyl phosphonate, molybdenum oleyl phosphonate, molybdenum phenyl phosphonate, molybdenum (p-nonylphenyl) phosphonate, molybdenum butyl butylphosphonate, molybdenum pentyl pentylphosphonate, molybdenum hexyl hexylphosphonate, molybdenum heptyl heptylphosphonate, molybdenum octyl octylphosphonate, molybdenum (1-methylheptyl) (1-methylheptyl)phosphonate, molybdenum (2-ethylhexyl) (2-ethylhexyl) phosphonate, molybdenum decyl decylphosphonate, molybdenum dodecyl dodecylphosphonate, molybdenum octadecyl octadecylphosphonate, molybdenum oleyl oleylphosphonate, molybdenum phenyl phenylphosphonate, molybdenum (p-nonylphenyl) (p-nonylphenyl)phosphonate, molybdenum butyl (2-ethylhexyl)phosphonate, molybdenum (2-ethylhexyl)butylphosphonate, molybdenum (1-methylheptyl) (2-ethylhexyl)phosphonate, molybdenum (2-ethylhexyl) (1-methylheptyl) phosphonate, molybdenum (2-ethylhexyl) (p-nonylphenyl) phosphonate, and molybdenum (p-nonylphenyl) (2-ethylhexyl) phosphonate.

Suitable molybdenum organophosphinates include molybdenum butylphosphinate, molybdenum pentylphosphinate, molybdenum hexylphosphinate, molybdenum heptylphosphinate, molybdenum octylphosphinate, molybdenum (1-methylheptyl)phosphinate, molybdenum (2-ethylhexyl) phosphinate, molybdenum decylphosphinate, molybdenum dodecylphosphinate, molybdenum octadecylphosphinate, molybdenum oleylphosphinate, molybdenum phenylphosphinate, molybdenum (p-nonylphenyl)phosphinate, molybdenum dibutylphosphinate, molybdenum dipentylphosphinate, molybdenum dihexylphosphinate, molybdenum diheptylphosphinate, molybdenum dioctylphosphinate, molybdenum bis(1-methylheptyl)phosphinate, molybdenum bis(2-ethylhexyl)phosphinate, molybdenum didecylphosphinate, molybdenum didodecylphosphinate, molybdenum dioctadecylphosphinate, molybdenum dioleylphosphinate, molybdenum diphenylphosphinate, molybdenum bis(p-nonylphenyl)phosphinate, molybdenum butyl(2-ethylhexyl) phosphinate, molybdenum (1-methylheptyl) (2-ethylhexyl) phosphinate, and molybdenum (2-ethylhexyl) (p-nonylphenyl) phosphinate.

Suitable molybdenum carbamates include molybdenum dimethylcarbamate, molybdenum diethylcarbamate, molybdenum diisopropylcarbamate, molybdenum dibutylcarbamate, and molybdenum dibenzylcarbamate.

Suitable molybdenum dithiocarbamates include molybdenum dimethyldithiocarbamate, molybdenum diethyldithiocarbamate, molybdenum diisopropyldithiocarbamate, molybdenum dibutyldithiocarbamate, and molybdenum dibenzyldithiocarbamate.

Suitable molybdenum xanthates include molybdenum methylxanthate, molybdenum ethylxanthate, molybdenum isopropylxanthate, molybdenum butylxanthate, and molybdenum benzylxanthate.

Suitable molybdenum p-diketonates include molybdenum acetylacetonate, molybdenum trifluoroacetylacetonate, molybdenum hexafluoroacetylacetonate, molybdenum benzoylacetonate, molybdenum 2,2,6,6-tetramethyl-3,5-heptanedionate, molybdenum dioxide bis(acetylacetonate), molybdenum dioxide bis(trifluoroacetylacetonate), molybdenum dioxide bis(hexafluoroacetylacetonate), molybdenum dioxide bis(benzoylacetonate), and molybdenum dioxide bis (2,2,6,6-tetramethyl-3,5-heptanedionate).

Suitable molybdenum alkoxides or aryloxides include molybdenum methoxide, molybdenum ethoxide, molybdenum isopropoxide, molybdenum 2-ethylhexoxide, molybdenum phenoxide, molybdenum nonylphenoxide, and molybdenum naphthoxide.

Suitable molybdenum halides include molybdenum hexafluoride, molybdenum pentafluoride, molybdenum tetrafluoride, molybdenum trifluoride, molybdenum pentachloride, molybdenum tetrachloride, molybdenum bichloride, molybdenum tetrabromide, molybdenum tribromide, molybdenum triiodide, and molybdenum diiodide.

Suitable molybdenum pseudo-halides include molybdenum cyanide, molybdenum cyanate, molybdenum thiocyanate, and molybdenum azide.

Suitable molybdenum oxyhalides include molybdenum oxytetrafluoride, molybdenum dioxydifluoride, molybdenum oxytetrachloride, molybdenum oxytrichloride, molybdenum dioxydichloride, molybdenum oxytribromide, and molybdenum dioxydibromide.

The term "organomolybdenum compound" refers to any molybdenum compound containing at least one molybdenum-carbon bond. Some specific examples of suitable organomolybdenum compounds include tris(allyl)molybdenum, tris(methallyl)molybdenum, tris(crotyl)molybdenum, bis(cyclopentadienyl)molybdenum, bis(pentamethylcyclopentadienyl) molybdenum, bis(ethylbenzene)molybdenum, bis(mesitylene)molybdenum, bis(pentadienyl)molybdenum, bis(2,4-dimethylpentadienyl)molybdenum, bis(allyl) tricarbonylmolybdenum, (cyclopentadienyl) (pentadienyl) molybdenum, tetra(1-norbornyl)molybdenum (trimethylenemethane) tetracarbonylmolybdenum, bis(butadiene)dicarbonylmolybdenum, (butadiene) tetracarbonylmolybdenum, and bis(cyclooctatetraene)molybdenum.

Useful hydrogen phosphite compounds that can be employed as ingredient (b) of the molybdenum-based catalyst composition utilized in this invention are either acyclic hydrogen phosphites, cyclic hydrogen phosphites, or mixtures thereof. These compounds are described above.

The molybdenum-based catalyst composition further comprises an organoaluminum compound, which has been designated as ingredient (c). As used herein, the term "organoaluminum compound" refers to any aluminum compound containing at least one aluminum-carbon bond. Organoaluminum compounds that are soluble in a hydrocarbon solvent are preferably employed.

A preferred class of organoaluminum compounds is represented by the general formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. Preferably, each R is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Preferably, each X is a carboxylate group, an alkoxide group, or an aryloxide group, with each group preferably containing from 1 carbon atom, or the appropriate minimum number of carbon atoms to form the group, up to about 20 carbon atoms.

Suitable types of organoaluminum compounds that can be utilized include, but are not limited to, trihydrocarbylaluminum, dihydrocarbylaluminum hydride, hydrocarbylaluminum dihydride, hydrocarbylaluminum dihalide, dihydrocarbylaluminum halide, dihydrocarbylaluminum carboxylate, hydrocarbylaluminum bis(carboxylate), dihydrocarbylaluminum alkoxide, hydrocarbylaluminum dialkoxide, dihydrocarbylaluminum aryloxide, hydrocarbylaluminum diaryloxide, and the like, and mixtures thereof. Trihydrocarbylaluminum compounds are generally preferred.

Suitable organoaluminum compounds include trimethylaluminum, triethylaluminum, triisobutylaluminum, tri-n-propylaluminum, triisopropylaluminum, tri-n-butylaluminum, tri-n-hexylaluminum, tri-n-octylaluminum, tricyclohexylaluminum, triphenylaluminum, tri-p-tolylaluminum, tribenzylaluminum, diethylphenylaluminum, diethyl-p-tolylaluminum, diethylbenzylaluminum, ethyldiphenylaluminum, ethyldi-p-tolylaluminum, ethyldibenzylaluminum, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolyl aluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n octylaluminum hydride, p-tolylethylaluminum hydride, p-tolyl-n-propylaluminum hydride, p-tolylisopropylaluminum hydride, p-tolyl-n-butylaluminum hydride, p-5-tolyl-isobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride, ethylaluminum dihydride, n-propylaluminum dibydride, isopropylaluminum dihydride, n-butylaluminum dihydride, isobutylaluminum dihydride, n-octylaluminum dibydride, dimethylaluminum chloride, diethyl aluminum chloride, diisobutylaluminum chloride, dimethylaluminum bromide, diethylaluminum bromide, dimethylaluminum fluoride, diethylaluminum fluoride, methylaluminum dichloride, ethylaluminum dichloride, isobutyl aluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methyl-aluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds that can be utilized is aluminoxanes. Aluminoxanes are well known in the art and comprise oligomeric linear aluminoxanes that can be represented by the general formula:

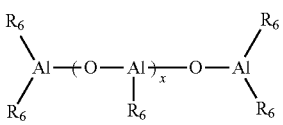

and oligomeric cyclic aluminoxanes that can be represented by the general formula:

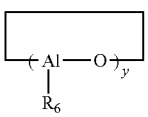

where x is an integer of 1 to about 100, preferably about 10 to about 50; y is an integer of 2 to about 100, preferably about 3 to about 20; and each $R_6$, which may be the same or different, is a mono-valent organic group that is attached to the aluminum atom via a carbon atom. Preferably, each $R_6$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atoms, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

In general, aluminoxanes can be prepared by reacting trihydrocarbylaluminum compounds with water. This reaction can be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is added to the monomer or monomer solution that is to be oligomerized, and then water is added.

Examples of aluminoxane compounds include methylaluminoxane (MAO), modified methylaluminoxane (MMAO), ethylaluminoxane, butylaluminoxane, isobutylaluminoxane, and the like, and mixtures thereof. Isobutylaluminoxane is particularly useful on the grounds of its availability and its solubility in aliphatic and cycloaliphatic hydrocarbon solvents. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Iron-based catalyst compositions are described in co-pending patent application U.S. Ser. No. 09/172,305, and U.S. Pat. Nos. 6,180,734 and 6,211,313, which are incorporated herein by reference. The iron-based catalyst compositions are formed by combining (a) an iron-containing compound, (b) a hydrogen phosphite, and (c) an organoaluminum compound.

Various iron-containing compounds or mixtures thereof can be employed as ingredient (a) of the iron-based catalyst composition utilized in this invention. Iron-containing compounds that are soluble in a hydrocarbon solvent such as aromatic hydrocarbons, aliphatic hydrocarbons, or cycloaliphatic hydrocarbons are preferably used. Hydrocarbon-insoluble iron-containing compounds, however, can be suspended in the polymerization medium to form the catalytically active species, and are therefore also useful.

The iron atom in the iron-containing compounds can be in various oxidation states including, but not limited to, the 0, +2, +3, and +4 oxidation states. Divalent iron compounds (also called ferrous compounds), wherein the iron is in the +2 oxidation state, and trivalent iron compounds (also called ferric compounds), wherein the iron is in the +3 oxidation state are preferred. Suitable types of iron-containing compounds that can be utilized in this invention include, but are not limited to, iron carboxylates, iron carbamates, iron dithiocarbamates, iron xanthates, iron β-diketonates, iron alkoxides, iron aryloxides, and organoiron compounds.

Suitable iron carboxylates include iron(II)formate, iron (III)formate, iron(II) acetate, iron(III) acetate, iron(II) acrylate, iron(III) acrylate, iron(II) methacrylate, iron(III) methacrylate, iron(II) valerate, iron(III) valerate, iron(II) gluconate, iron(III) gluconate, iron(II)citrate, iron(III)citrate, iron(II)fumarate, iron(III)fumarate, iron(II) lactate, iron(III) lactate, iron(II) maleate, iron(III) maleate, iron(II) oxalate, iron(III) oxalate, iron(II) 2-ethylhexanoate, iron(III) 2-ethylhexanoate, iron(II) neodecanoate, iron(III) neodecanoate, iron(II) naphthenate, iron(III) naphthenate, iron(II) stearate, iron(III) stearate, iron(II) oleate, iron(III) oleate, iron(II) benzoate, iron(III) benzoate, iron(II) picolinate, and iron(III) picolinate.

Suitable iron carbamates include iron(II) dimethylcarbamate, iron(III) dimethylcarbamate, iron(II) diethylcarbamate, iron(III) diethylcarbamate, iron(II) diisopropylcarbamate, iron(III) diisopropylcarbamate, iron(II) dibutylcarbamate, iron(III) dibutylcarbamate, iron(II) dibenzylcarbamate, and iron(III) dibenzylcarbamate.

Suitable iron dithiocarbamates include iron(II) dimethyldithiocarbamate, iron(III) dimethyldithiocarbamate, iron (II) diethyldithiocarbamate, iron(III) diethyldithiocarbamate, iron(II) diisopropyldithiocarbamate, iron(III) diisopropyldithiocarbamate, iron(II) dibutyldithiocarbamate, iron(III) dibutyldithiocarbamate, iron(II) dibenzyldithiocarbamate, and iron(III) dibenzyldithiocarbamate.

Suitable iron xanthates include iron(II) methylxanthate, iron(III) methylxanthate, iron(II) ethylxanthate, iron(III) ethylxanthate, iron(II) isopropylxanthate, iron(II) isopropylxanthate, iron(II) butylxanthate, iron(III) butylxanthate, iron(II) benzylxanthate, and iron(III) benzylxanthate.

Suitable iron β-diketonates include iron(II) acetylacetonate, iron(III) acetylacetonate, iron(II) trifluoroacetylacetonate, iron(III) trifluoroacetylacetonate, iron(II) hexafluoroacetylacetonate, iron(III) hexafluoroacetylacetonate, iron(II) benzoylacetonate, iron(III) benzoylacetonate, iron(II) 2,2,6, 6-tetramethyl-3,5-heptanedionate, and iron(III) 2,2,6,6-tetramethyl-3,5-heptanedionate.

Suitable iron alkoxides or aryloxides include iron(II) methoxide, iron(III) methoxide, iron(II) ethoxide, iron(III) ethoxide, iron(II) isopropoxide, iron(III) isopropoxide, iron(II) 2-ethylhexoxide, iron(III) 2-ethylhexoxide, iron(II) phenoxide, iron(III) phenoxide, iron(II) nonylphenoxide, iron(III) nonylphenoxide, iron(II) naphthoxide, and iron(III) naphthoxide.

The term "organoiron compound" refers to any iron compound containing at least one iron-carbon bond. Some specific examples of suitable organoiron compounds include bis(cyclopentadienyl)iron(II) (also called ferrocene), bis (pentamethylcyclopentadienyl)iron(II) (also called decamethylferrocene), bis(pentadienyl) iron(II), bis(2,4-dimethylpentadienyl) iron(II), bis(allyl) dicarbonyliron(II), (cyclopentadienyl) (pentadienyl)iron(II), tetra(1-norbornyl) iron(IV), (trimethylenemethane)tricarbonyliron(II), bis (butadiene)carbonyliron(0), butadienetricarbonyliron(0), and bis(cyclooctatetraene)iron(0).

Useful hydrogen phosphite compounds that can be employed as ingredient (b) of the iron-based catalyst composition utilized in this invention are either acyclic hydrogen phosphite, cyclic hydrogen phosphites, or mixtures thereof. These compounds are described above.

Useful organoaluminum compounds that can be employed as ingredient (c) of the molybdenum-based catalyst composition, described above, are also suitable for use as ingredient (c) of the iron-based catalyst composition.

The catalyst compositions utilized in this invention have very high catalytic activity for polymerizing 1,3-butadiene into syndiotactic 1,2-polybutadiene over a wide range of total catalyst concentrations and catalyst ingredient ratios. The polymers having the most desirable properties, however, are obtained within a narrower range of total catalyst concentrations and catalyst ingredient ratios. Further, it is believed that the three catalyst ingredients (a), (b), and (c) can interact to form an active catalyst species. Accordingly, the optimum concentration for any one catalyst ingredient is dependent upon the concentrations of the other catalyst ingredients.

With respect to the chromium-based catalyst composition, the molar ratio of the hydrogen phosphite to the chromium-containing compound (P/Cr) can be varied from about 0.5:1 to about 50:1, more preferably from about 1:1 to about 25:1, and even more preferably from about 2:1 to about 10:1. The molar ratio of the organomagnesium compound to the chromium-containing compound (Mg/Cr) can be varied from about 1:1 to about 50:1, more preferably from about 2:1 to about 30:1, and even more preferably from about 3:1 to about 20:1.

With respect to the molybdenum-based or iron-based catalyst compositions, the molar ratio of the hydrogen phosphite to the molybdenum containing compound (P/Mo) or to the iron-containing compound (P/Fe) can be varied from about 0.5:1 to about 50:1, more preferably from about 1:1 to about 25:1, and even more preferably from about 2:1 to about 10:1. Where ingredient (c) of the catalyst composition comprises an organoaluminum compound defined by the formula $AlR_nX_{3-n}$, the molar ratio of the organoaluminum compound to the molybdenum-containing compound (Al/Mo) or to the iron-containing compound (Al/Fe) can be varied from about 1:1 to about 100:1, more preferably from about 3:1 to about 50:1, and even more preferably from about 5:1 to about 25:1. When ingredient (c) of the catalyst composition utilized in the present invention comprises an aluminoxane, the molar ratio of the aluminoxane to the molybdenum-containing compound (Al/Mo) or to the iron-containing compound (Al/Fe) can be varied from about 5:1 to about 500:1, more preferably from about 10:1 to about 200:1, and even more preferably from about 20:1 to about 100:1.

The catalyst composition is preferably formed by combining the three catalyst ingredients (a), (b), and (c). Although an active catalyst species is believed to result from this combination, the degree of interaction or reaction between the various ingredients or components is not known with any great degree of certainty. Therefore, it should be understood that the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition utilized to prepare the syndiotactic 1,2-polybutadiene can be formed by combining or mixing the catalyst ingredients or components by using, for example, one of the following methods:

First, the catalyst composition may be formed in situ by adding the three catalyst ingredients to the rubber cement containing the rubbery elastomer and 1,3-butadiene monomer in either a stepwise or simultaneous manner. When adding the catalyst ingredients in a stepwise manner, the sequence in which the ingredients are added is not critical. With regard to the chromium-based catalyst, the organomagnesium compound is preferably added first, followed by the chromium-containing compound, and then followed by the hydrogen phosphite. With regard to the molybdenum-based or iron-based catalyst, the molybdenum-containing or iron-containing compound is preferably added first, followed by the hydrogen phosphite, and then followed by the organoaluminum compound.

Second, the three catalyst ingredients may be pre-mixed outside the polymerization system at an appropriate temperature, which is generally from about −20° C. to about 80° C., and the resulting catalyst composition is then added to the rubber cement containing the rubbery elastomer and 1,3-butadiene monomer.

Third, the catalyst composition may be pre-formed in the presence of conjugated diene monomer. That is, the three catalyst ingredients are pre-mixed in the presence of a small amount of conjugated diene monomer at an appropriate temperature, which is generally from about −20° C. to about 80° C. The amount of 1,3-butadiene monomer that is used for the catalyst pre-forming can range from about 1 to about 500 moles, more preferably from about 4 to about 100 moles, and even more preferably from about 10 to about 50 moles per mole of the chromium-containing, molybdenum-containing, or iron-containing compound. The resulting catalyst composition is then added to the rubber cement containing the rubbery elastomer and the 1,3-butadiene monomer that is to be polymerized.

Fourth, as a further variation, the catalyst composition can also be formed by using a two-stage procedure. The first stage involves combining the chromium-containing compound and the organomagnesium compound or the molybdenum-containing or iron-containing compound and the organoaluminum compound, in the presence of a small amount of conjugated diene monomer at an appropriate temperature, which is generally from about −20° C. to about 80° C. In the second stage, the foregoing reaction mixture and the hydrogen phosphite are charged in either a stepwise or simultaneous manner to the rubber cement containing the rubbery elastomer and the 1,3-butadiene monomer that is to be polymerized.

Fifth, an alternative two-stage procedure may also be employed. A chromium-ligand, molybdenum-ligand, or iron-ligand, complex is first formed by pre-combining the chromium-containing compound, molybdenum-containing compound, or iron-containing and the hydrogen phosphite compound. Once formed, the chromium complex is then combined with the organomagnesium compound, or the molybdenum or iron complex is combined with the organoaluminum compound, respectively, to form the active catalyst species. The complex can be formed separately or in the rubber cement containing the rubbery elastomer and the 1,3-butadiene monomer that is to be polymerized. This complexation reaction can be conducted at any convenient temperature at normal pressure, but for an increased rate of reaction, it is preferred to perform this reaction at room temperature or above. The time required for the formation of the complex is usually within the range of about 10 minutes to about 2 hours after mixing the chromium-containing, molybdenum-containing or iron-containing compound with the hydrogen phosphite compound. The temperature and time used for the formation of the complex will depend upon several variables including the particular starting materials and the solvent employed. Once formed, the complex can be used without isolation from the complexation reaction mixture. If desired, however, the complex may be isolated from the complexation reaction mixture before use.

Sixth, the three catalyst ingredients may be added to the rubber cement prior to or simultaneously with the addition of 1,3-butadiene monomer.

When a solution of the catalyst composition or one or more of the catalyst ingredients is prepared outside the polymerization system as set forth in the foregoing methods, an organic solvent or carrier is preferably employed. Useful organic solvents are described above. Organic solvents may serve to dissolve the catalyst composition or ingredients, or the solvent may simply serve as a carrier in which the catalyst composition or ingredients may be suspended.

The production of blends of syndiotactic 1,2-polybutadiene and rubbery elastomers according to this invention is accomplished by polymerizing 1,3-butadiene monomer within the rubber cement by using a catalytically effective amount of at least one of the foregoing catalyst compositions. The total catalyst concentration to be employed in the polymerization mass depends on the interplay of various factors such as the purity of the ingredients, the polymerization temperature, the polymerization rate and conversion desired, and many other factors. Accordingly, a specific total catalyst concentration cannot be definitively set forth except to say that catalytically effective amounts of the respective catalyst ingredients should be used. Generally, the amount of the chromium-containing, molybdenum-containing, or iron-containing compound used can be varied from about 0.01 to about 2 mmol per 100 g of 1,3-butadiene monomer, more preferably from about 0.02 to about 1.0 mmol per 100 g of 1,3-butadiene monomer, and even more preferably from about 0.05 to about 0.5 mmol per 100 g of 1,3-butadiene monomer.

In performing the polymerization of 1,3-butadiene into syndiotactic 1,2-polybutadiene within the rubber cement, a molecular weight regulator may be employed to control the molecular weight of the syndiotactic 1,2-polybutadiene to be produced. As a result, the scope of the polymerization system can be expanded in such a manner that it can be used for the production of syndiotactic 1,2-polybutadiene having a wide range of molecular weights. Suitable types of molecular weight regulators that can be utilized include, but are not limited to, α-olefins such as ethylene, propylene, 1-butene, 1-pentene, 1-hexene, 1-heptene, and 1-octene; accumulated diolefins such as allene and 1,2-butadiene; nonconjugated diolefins such as 1,6-octadiene, 5-methyl-1,4-hexadiene, 1,5-cyclooctadiene, 3,7-dimethyl-1,6-octadiene, 1,4-cyclohexadiene, 4-vinylcyclohexene, 1,4-pentadiene, 1,4-hexadiene, 1,5-hexadiene, 1,6-heptadiene, 1,2-divinylcyclohexane, 5-ethylidene-2-norbornene, 5-methylene-2-norbornene, 5-vinyl-2-norbornene, dicyclopentadiene, and 1,2,4-trivinylcyclohexane; acetylenes such as acetylene, methylacetylene and vinylacetylene; and mixtures thereof. The amount of the molecular weight regulator used, expressed in parts per hundred parts by weight of the 1,3-butadiene monomer (phm), is from about 0.01 to about 10 phm, more preferably from about 0.02 to about 2 phm, and even more preferably from about 0.05 to about 1 phm.

The molecular weight of the syndiotactic 1,2-polybutadiene to be produced can also be effectively controlled by conducting the polymerization of 1,3-butadiene monomer in the presence of hydrogen gas. In this case, the partial pressure of hydrogen gas is preferably from about 0.01 to about 50 atmospheres.

The polymerization of 1,3-butadiene into syndiotactic 1,2-polybutadiene within the rubber cement may be carried out as a batch process, a continuous process, or even a semi-continuous process. In the semi-continuous process, 1,3-butadiene monomer is intermittently charged as needed to replace that monomer already polymerized. In any case, the polymerization is desirably conducted under anaerobic conditions by using an inert protective gas such as nitrogen, argon or helium, with moderate to vigorous agitation. The polymerization temperature may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the 1,3-butadiene monomer or the solvent, or a combination of the two methods. Although the polymerization pressure employed may vary widely, a preferred pressure range is from about 1 atmosphere to about 10 atmospheres.

Once a desired conversion is achieved, the polymerization of 1,3-butadiene monomer into syndiotactic 1,2-polybutadiene within the rubber cement can be stopped by adding a polymerization terminator that inactivates the catalyst system. Typically, the terminator employed to inactivate the catalyst system is a protic compound, which includes, but is not limited to, an alcohol, a carboxylic acid, an inorganic acid, water, or a combination thereof. An antioxidant such as 2,6-di-tert-butyl-4-methylphenol may be added along with, before or after the addition of the terminator. The amount of the antioxidant employed is usually in the range of 0.2% to 1% by weight of the polymer product. When the polymerization reaction has been stopped, the blend of syndiotactic 1,2-polybutadiene and the rubbery elastomer can be recovered from the polymerization mixture by utilizing conventional procedures of desolventization and drying. For instance, the blend of syndiotactic 1,2-polybutadiene and the rubbery elastomer may be isolated from the polymerization mixture by coagulation of the polymerization mixture with an alcohol such as methanol, ethanol, or isopropanol, or by steam distillation of the solvent and the unreacted 1,3-butadiene monomer, followed by filtration. The product is then dried to remove residual amounts of solvent and water. The polymer blend produced is a highly dispersed blend of crystalline syndiotactic 1,2-polybutadiene in the rubbery elastomer.

Advantageously, the catalyst composition employed in this invention can be manipulated to vary the characteristics of the syndiotactic 1,2-polybutadiene in the polymer blend. Namely, the syndiotactic 1,2-polybutadiene in the polymer blend made by the process of this invention can have various melting temperatures, molecular weights, 1,2-linkage contents, and syndiotacticities, all of which are dependent upon the selection of the catalyst ingredients and the ingredient ratios.

The blends of syndiotactic 1,2-polybutadiene and rubbery elastomers produced with the process of this invention have many uses. For example, these blends can be utilized in rubber compositions that are used to manufacture the supporting carcass, innerliner, sidewall, and tread of tires. The blends of syndiotactic 1,2-polybutadiene and rubbery elastomers are also useful in the manufacture of films and packaging materials and in many molding applications.

In a preferred embodiment, the blend of syndiotactic 1,2-polybutadiene in rubbery elastomer is added to rubber compositions that are useful in the manufacture of tires. As is generally known in the art, these rubber compositions or tire formulations include a base rubber, filler, vulcanizing agent, and sundry additional additives that are common in rubber compounding.

Both synthetic and natural rubber may be employed within the rubber compositions. These rubbers, which may also be referred to as elastomers, include, without limitation, natural rubber, synthetic polyisoprene, poly(styrene-co-butadiene), polybutadiene, poly(styrene-co-butadiene-co-isoprene), poly(styrene-co-isoprene), and mixtures thereof.

The rubber compositions may include fillers such as inorganic and organic fillers. Organic fillers include carbon black. Inorganic fillers include silica, aluminum hydroxide, magnesium hydroxide, and clays (hydrated aluminum silicates).

A multitude of rubber vulcanizing agents, which are also referred to as curing agents, can be employed within these rubber compositions. For example, sulfur or peroxide-based curing systems may be employed. Also, see Kirk Othmer, ENCYCLOPEDIA OF CHEMICAL TECHNOLOGY, 3$^{rd}$ Edition, Wiley Interscience, 30 N.Y. 1982, Vol. 20, pp. 365-468, particularly VULCANIZATION AGENTS AND AUXILIARY MATERIALS pp. 390-402, or Vulcanization by A.Y. Coran, ENCYCLOPEDIA OF POLYMER SCIENCE AND ENGINEERING, 2$^{nd}$ Edition, John Wiley & Sons, Inc., 1989, which are incorporated herein by reference. Vulcanizing agents may be used alone or in combination.

The rubber compositions may also include other compounding additives such as accelerators, oils, waxes, scorch inhibiting agents, processing aids, antidegradants, zinc oxide, optional tackifying resins, optional reinforcing resins, optional fatty acids, and optional peptizers.

In one preferred embodiment, a blend of syndiotactic 1,2-polybutadiene and EPDM, prepared according to the process of this invention, is employed with a rubber composition that is useful for the manufacture of tire sidewalls. The preferred blend includes from about 0.4 to about 12 parts by weight SPB and from about 99.6 to about 88 parts by weight EPDM. More preferably, the blend includes from about 2 to about 10 parts by weight SPB and from about 98 to about 90 parts by weight EPDM.

When practicing this embodiment, the blend is combined and compounded with a base rubber in an amount from about 1 to about 40 parts by weight blend phr, preferably from about 2 to about 20 parts by weight phr, and even more preferably from about 5 to about 10 parts by weight blend phr.

Sidewall formulations also typically include a filler, which is employed in an amount from about 10 to about 70 parts by weight phr, preferably from 20 about 20 to about 60 parts by weight phr, and more preferably from about 25 to about 50 parts by weight phr.

The syndiotactic 1,2-polybutadiene within the EPDM rubbery elastomer that is utilized in tire sidewall formulations preferably has a melting temperature from about 70 to about 210° C., more preferably from about 90 to about 195° C., and even more preferably from about 110° C. to about 190° C.

Fillers are typically employed in an amount from about 1 to about 100 parts by weight phr, and preferably from about 20 to about 90 parts by weight phr, and more preferably from about 40 to about 80 parts by weight pier.

Those skilled in the art will be able to choose a useful amount of the other ingredients that may be employed in these rubber compositions. For example, it is generally known in the art of making tire components that sulfur is typically employed in an amount from about 0.5 to about 10 parts by weight phr, and preferably from about 1 to about 6 parts by weight phr. Oils are typically employed in an amount from about 1 to about 60 parts by weight phr, and preferably in an amount from about 1 to about 50 parts by weight phr. Zinc oxide is typically employed in an amount from about 0.5 to about 8 by weight phr, and preferably from about 1 to about 5 parts by weight phr.

Rubber formulations are compounded by using mixing equipment and procedures conventionally employed in the art. Preferably, an initial masterbatch is prepared that includes the rubber component and the reinforcing fillers, as well as other optional additives such as processing oil and antidegradants. The blend of syndiotactic 1,2-polybutadiene and EPDM is preferably added during preparation of the initial masterbatch. This masterbatch is typically mixed at temperatures in excess of about 100 or 150° C. To prevent premature vulcanization, also known as scorch, the initial masterbatch generally excludes the vulcanizing agent. Once the initial masterbatch is prepared, the vulcanizing agent is blended into the composition at lower temperatures. Rubber compounding techniques and the additives employed therein are generally known as disclosed in *The Compounding and Vulcanization of Rubber*, by Stevens in RUBBER TECHNOLOGY SECOND EDITION (1973 Van Nostrand Reihold Company). The mixing conditions and procedures applicable to silica-filled tire formulations are also well known as described in U.S. Pat. Nos. 5,227,425; 5,719,207; 5,717,022, as well as EP 0890606, all of which are incorporated herein by reference.

The rubber compositions can then be processed into tire components, including sidewalls, according to ordinary tire manufacturing techniques including standard rubber molding and curing techniques. Typically, vulcanization is effected by heating the vulcanizable composition in a mold; e.g., it is heated to about 170° C. Cured or crosslinked rubber compositions may be referred to as vulcanizates, which generally contain three-dimensional polymeric networks that are thermoset. The other ingredients, such as fillers, oils, and antidegradants, are generally dispersed throughout the network.

While the blends of this invention are preferably added to formulations used to make tire sidewalls, the blend can also be used within other tire components such as treads, sub-treads, body ply skims, bead fillers and the like. Pneumatic tires can be made as discussed in U.S. Pat. Nos. 5,866,171; 5,876,527; 5,931,211; and 5,971,046, which are incorporated herein by reference.

In order to demonstrate the practice of the present invention, the following examples have been prepared and tested as described in the Examples disclosed hereinbelow. The examples should not, however, be construed as limiting the scope of the invention. The claims will serve to define the invention.

EXAMPLES

Example 1

Preparation of sPB/EPDM Blend

A highly dispersed blend of syndiotactic 1,2-polybutadiene and EPDM was prepared by polymerizing 1,3-butadiene monomer into syndiotactic 1,2-polybutadiene within an EPDM rubber cement.

The EPDM rubber cement was prepared by dissolving 50 g of EPDM to form a solution containing 15% by weight solids by dissolving in 300 grams of hexane. The EPDM contained about 56% ethylene, about 6% 5-ethylidene-2-norborene, had a number average molecular weight ($M_n$) of 60,000 and a Mooney Viscosity ($ML_{1+4}$@100° C.) of about 35.

At room temperature, adding 12 grams of a 1,3-butadiene/hexane blend containing 22.4% by weight of 1,3-butadiene were added to the EPDM rubber cement produced above. The polymerization of the 1,3-butadiene monomer into syndiotactic 1,2-polybutadiene was initiated by the addition of 6.25 mL of 0.032 M iron(III) 2-ethylhexanoate in hexanes, 0.27 mL of 2.93 M bis(2-ethylhexyl) hydrogen phosphite in hexanes, and 6.0 mL of 0.68 M triisobutylaluminum in hexanes. The polymerization was conducted at 50° C. for 6 hours. The polymerization was stopped by the addition of 3 mL of isopropanol diluted with 50 mL of hexanes. The polymerization mixture was added into 10 liters of isopropanol containing 12 g of 2,6-di-tert-butyl-4-methylphenol. The polymer blend of 3% syndiotactic 1,2-polybutadiene in EPDM was isolated by filtration and dried to a constant weight under vacuum of 60° C. Differential scanning calorimetry (DSC) revealed a broad Tm peak, between 190°-205° C., that was attributed to the formation of syndiotactic 1,2-polybutadiene. A blend containing 6% syndiotactic 1,2-polybutadiene in EPDM and a blend containing 12% syndiotactic 1,2-polybutadiene in EPDM were prepared exactly as above, except that the amounts of 1,3-butadiene monomer and catalyst components were adjusted.

Analysis showed that SPB did form within the EPDM as evidenced by melting temperature peaks (Tm) within a DSC curve.

Example 2

Preparation of a 6% sPB/EPDM Blend

Approximately 50 grams of an EPDM sample (E/P=55/45, $M_n$=60 k, the diene is 5-ethylidene-2-norbornene or ENB, 6%) was dissolved in 450 mL of hexanes to form a solution containing 15% solids. A mixture of 1,3-butadiene (Bd) monomer in hexanes was charged (5.0 grams total of Bd) followed by the addition of $Fe(EHA)_3$ (0.1 mmol) in hexanes, $HPO(OEH)_2$ (0.4 mmol) in hexanes and TIBA (2 mmol) in hexanes. The mixture was agitated at 50° C. for 6 hours. The reaction mixture was poured into isopropyl alcohol with agitation, isolated, air-dried, and then vacuum-dried to remove any remaining solvent. The polymer mixture was analyzed by differential scanning calorimetry (DSC) which revealed a broad $T_m$ peak ($T_m$=190-205° C.) attributed to the formation of the sPB.

Examples 3-4

Application of the sPB-EPDM In-Situ Blend in Black Sidewall EPDM Formulation

TABLE 1

Formulations for Examples 3-4

|  | Example | |
| --- | --- | --- |
|  | 3 | 4 |
| Formulation | PHR | PHR |
| JSR EP35* | 40 |  |
| Example 1 blend |  | 40 |
| cis-Polybutadiene | 40 | 40 |
| Natural Rubber | 20 | 20 |
| Carbon Black | 50 | 50 |
| Aromatic Oil | 17 | 17 |

TABLE 1-continued

Formulations for Examples 3-4

|  | Example | |
| --- | --- | --- |
|  | 3 | 4 |
| Stearic Acid | 2 | 2 |
| Sulfur | 1.5 | 1.5 |
| Zinc Oxide | 3 | 3 |
| Accelerators Total | 0.5 | 0.5 |

*Note:
JSR EP35 is an EPDM available from Japan synthetic rubber.

TABLE 2

Mixing conditions for Examples 3-4 using a brabender mixer.

|  | Master Batch | Remill | Final |
| --- | --- | --- | --- |
| Start Temp. ° C. | 100 | 100 | 70 |
| Dump Temp. ° C. | 160 | 160 | 100 |
| Time (min.) | 5 | 5 | 2 |
| RPM | 60 | 60 | 40 |

TABLE 3

Properties of Examples 3-4

|  | Stock | |
| --- | --- | --- |
|  | 3 | 4 |
| ML 1 + 4 130° C. | 35.1 | 38.2 |
| Ring Tensile at 23° C. |  |  |
| EB % | 622 | 664 |
| TB | 9.27 | 8.44 |
| M100 | 1.29 | 1.11 |
| Dynastst, Tan Delta at 50° C. | 0.194 | 0.189 |
| Ring Tear at 23° C., EB % | 578 | 673 |
| Tear Strength (normalized) | 1 | 1.07 |

ML 1+4 130° C. was measured using ASTM-D1646. Ring Tensile at 23° C., EB % was measured using ASTM-D412. Tan Delta at 50° C. was measured using a Dynastat Viscosity Analyzer. Ring Tear at 23° C., EB % was measured using ASTM-624.

TABLE 4

Cut Growth Rate of Examples 3-4

|  | Stock | |
| --- | --- | --- |
|  | 3 | 4 |
| Crack Growth Resistance Dc/Dn (nm/cycle) at 50° C. | 51 | 45 |
| Tearing Energy (J/m²) | 1210 | 1145 |

Dc/Dn (nm/cycle) was measured in a "pure shear" geometry with a precut [Reference: Lake G J, *Rubber Chemistry and Technology*, 68: (3), 435-460, 1995]. The testing sheet had a length of 20.32 cm, a height of 64.5 mm and a thickness of 2 mm. A pre-cut of 4.0 cm was made along the length direction. Cyclic deformation was applied along the height direction with a strain amplitude of 2.5% to 25%, and with a frequency of 1 to 100 Hz. The testing condition was a 40 Hz half-sinusoidal pulse for a 5 Hz deformation cycle under 10% strain amplitude at various temperatures (23° C.-80° C.). Images of the propagating crack were recorded automatically at a given interval of about 10,000 cycles. Crack growth rate (dc/dn) is then calculated by the increment of crack length at each cycle (nm/cycles). This type of cut growth rate of 45 and below is advantageous in many applications.

Although the present invention has been described in the above examples with reference to particular means, materials and embodiments, it would be obvious to persons skilled in the art that various changes and modifications may be made, which fall within the scope claimed for the invention as set out in the appended claims. The invention is therefore not limited to the particulars disclosed and extends to all equivalents within the scope of the claims.

What is claimed is:

1. A tire sidewall composition comprising a blend of syndiotactic 1,2-polybutadiene and an elastomeric terpolymer polymerized from ethylene, at least one α-olefin monomer, and at least one diene monomer, wherein said blend is prepared by:
   a. providing a mixture of a rubber cement and 1,3-butadiene monomer, wherein the rubber cement comprises an elastomeric terpolymer polymerized from ethylene, at least one α-olefin monomer, and at least one diene monomer; and
   b. polymerizing the 1,3-butadiene monomer into syndiotactic 1,2-polybutadiene within the rubber cement by using a catalyst composition that is formed by combining (a) a chromium-containing compound, (b) a hydrogen phosphite, and (c) an organomagnesium compound or (a) a molbydenum-containing compound or an iron-containing compound, (b) a hydrogen phosphite, and (c) an organoaluminum compound;
   wherein the composition is incorporated in a tire sidewall;
   wherein the blend of syndiotactic 1,2-polybutadiene in said terpolymer comprises from about 3 percent to about 12 percent by weight of syndiotactic 1,2-polybutadiene,
   wherein a test sheet of the composition has a cut growth of 45 Dc/Dn (nm/cycle) and below at 50° C.

2. A tire sidewall composition comprising a blend of syndiotactic 1,2-polybutadiene and an elastomeric terpolymer polymerized from ethylene, at least one α-olefin monomer, and at least one diene monomer, wherein said blend is prepared by:
   a. providing a mixture of a rubber cement and 1,3-butadiene monomer, wherein the rubber cement comprises an elastomeric terpolymer polymerized from ethylene, at least one α-olefin monomer, and at least one diene monomer;
   b. preparing a catalyst composition, wherein the catalyst composition is prepared by combining, outside the presence of the mixture of rubber cement and 1,3-butadiene monomer, (a) a chromium-containing compound, (b) a hydrogen phosphite, and (c) an organomagnesium compound or (a) a molybdenum-containing compound or an iron-containing compound or (b) a hydrogen phosphite, and (c) an organomagnesium compound; and
   c. adding the catalyst composition to the mixture and thereby polymerizing the 1,3-butadiene monomer into syndiotactic 1,2-polybutadiene within the rubber cement;
   wherein the composition is incorporated in a tire sidewall;
   wherein the blend of syndiotactic 1,2-polybutadiene in said terpolymer comprises from about 3 percent to about 12 percent by weight of syndiotactic 1,2-polybutadiene;
   wherein a test sheet of the composition has a cut growth of 45 Dc/Dn (nm/cycle) and below at 50° C.

3. The tire sidewall composition of claim 1, wherein the syndiotactic 1,2-polybutadiene has a melting temperature of from about 70° C. to about 210° C.

4. The tire sidewall composition of claim 2, wherein the syndiotactic 1,2-polybutadiene has a melting temperature of from about 70° C. to about 210° C.

5. The tire sidewall composition of claim 1, wherein the α-olefin monomer is propylene, 1-butene, 1-hexene, 4-methyl-1-pentene, 1-octene, 1-decene, or a combination thereof.

6. The tire sidewall composition of claim 2, wherein the α-olefin monomer is propylene, 1-butene, 1-hexene, 4-methyl-1-pentene, 1-octene, 1-decene, or a combination thereof.

7. The tire sidewall composition of claim 1, wherein the diene monomer is 5-ethylidene-2-norbornene, 1,4-hexadiene, 5-methylene-2-norbornene, 1,6-octadiene, 5-methyl-1,4-hexadiene, 3,7-methyl-1,6-octadiene, 1,3-cyclopentadiene, 1,4-cyclohexadiene, dicyclopentadiene, 5-vinyl-2-norbornene, or a combination thereof.

8. The tire sidewall composition of claim 2, wherein the diene monomer is 5-ethylidene-2-norbornene, 1,4-hexadiene, 5-methylene-2-norbornene, 1,6-octadiene, 5-methyl-1,4-hexadiene, 3,7-methyl-1,6-octadiene, 1,3-cyclopentadiene, 1,4-cyclohexadiene, dicyclopentadiene, 5-vinyl-2-norbornene, or a combination thereof.

9. The tire sidewall composition of claim 1, wherein said step of combining (a) a chromium-containing compound, (b) a hydrogen phosphite, and (c) an organomagnesium compound, or said step of combining (a) a molybdenum-containing compound, or an iron-containing compound, (b) a hydrogen phosphite, and (c) an organoaluminum compound, occurs in the presence of at least one type of conjugated diene monomer.

10. The tire sidewall composition of claim 2, wherein said step of combining (a) a chromium-containing compound, (b) a hydrogen phosphite, and (c) an organomagnesium compound, or said step of combining (a) a molybdenum-containing compound, or an iron-containing compound, (b) a hydrogen phosphite, and (c) an organoaluminum compound, occurs in the presence of at least one type of conjugated diene monomer.

11. The tire sidewall composition of claim 1, wherein said step of polymerizing includes adding from about 0.01 to about 2 mmol of a compound selected from the group consisting of a chromium-containing compound, a molybdenum-containing compound, or an iron-containing compound per 100 g of 1,3-butadiene.

12. The tire sidewall composition of claim 2, wherein said catalyst composition is added to the mixture of rubber cement and 1,3-butadiene monomer such that the chromium-containing compound, the molybdenum-containing compound, or the iron-containing compound is present in an amount of about 0.01 to about 2 mmol per 100 g of 1,3-butadiene.

13. The tire sidewall composition of claim 1, further comprising cis-polybutadiene.

14. The tire sidewall composition of claim 2, further comprising cis-polybutadiene.

15. The tire sidewall composition of claim 1, further comprising natural rubber.

16. The tire sidewall composition of claim 2, further comprising natural rubber.

17. The tire sidewall composition of claim 1 wherein the elastomeric terpolymer is EPDM.

18. The tire sidewall composition of claim 2 wherein the elastomeric terpolymer is EPDM.

* * * * *